US012759586B2

(12) United States Patent
Echtler

(10) Patent No.: US 12,759,586 B2
(45) Date of Patent: Oct. 13, 2026

(54) METHOD AND SYSTEM FOR ASSISTING A DRIVER OF A MOTOR VEHICLE IN CLEARING A PATH FOR EMERGENCY VEHICLES

(71) Applicant: Bayerische Motoren Werke Aktiengesellschaft, Munich (DE)

(72) Inventor: Johannes Echtler, Hohenpeissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 285 days.

(21) Appl. No.: 18/285,901

(22) PCT Filed: Apr. 5, 2022

(86) PCT No.: PCT/EP2022/058999
§ 371 (c)(1),
(2) Date: Oct. 6, 2023

(87) PCT Pub. No.: WO2022/214477
PCT Pub. Date: Oct. 13, 2022

(65) Prior Publication Data
US 2024/0182075 A1 Jun. 6, 2024

(30) Foreign Application Priority Data
Apr. 8, 2021 (DE) ..................... 10 2021 108 808.9

(51) Int. Cl.
*B60W 60/00* (2020.01)

(52) U.S. Cl.
CPC .... *B60W 60/0025* (2020.02); *B60W 60/0051* (2020.02); *B60W 60/0015* (2020.02);
(Continued)

(58) Field of Classification Search
CPC ......... B60W 60/0025; B60W 60/0051; B60W 60/0015; B60W 60/0017;
(Continued)

(56) References Cited

U.S. PATENT DOCUMENTS 9,869,560 B2 * 1/2018 Gordon ................ G05D 1/0061
9,934,685 B1 * 4/2018 Bernhardt .............. G08G 1/005
(Continued)

FOREIGN PATENT DOCUMENTS

CN 111477018 A 7/2020
CN 112218266 A 1/2021
(Continued)

OTHER PUBLICATIONS

International Search Report (PCT/ISA/210) issued in PCT Application No. PCT/EP2022/058999 dated Aug. 11, 2022 with English translation (4 pages).
(Continued)

*Primary Examiner* — Andrew R Dyer
(74) *Attorney, Agent, or Firm* — Crowell & Moring LLP

(57) ABSTRACT

A method for assisting a driver of a motor vehicle in clearing a path for emergency vehicles includes detecting a traffic jam situation for the motor vehicle, determining a need to clear a path for emergency vehicles on the basis of the detected traffic jam situation, detecting the driver's viewing direction, and semi-automatically or fully automatically controlling the motor vehicle according to the determined need to clear a path for emergency vehicles and the driver's detected viewing direction.

4 Claims, 1 Drawing Sheet

(52) U.S. Cl.
CPC . *B60W 2420/403* (2013.01); *B60W 2540/225* (2020.02); *B60W 2552/10* (2020.02); *B60W 2554/406* (2020.02); *B60W 2554/60* (2020.02)

(58) Field of Classification Search
CPC ..... B60W 2420/403; B60W 2540/225; B60W 2552/10; B60W 2554/406; B60W 2554/60; B60W 2554/4048; B60W 2554/408; B60W 30/18163; B60W 40/04
USPC .......................................................... 701/23
See application file for complete search history.

(56) References Cited

U.S. PATENT DOCUMENTS

| | | | | |
|---|---|---|---|---|
| 10,490,067 | B2 * | 11/2019 | Li | G08G 1/0967 |
| 10,593,202 | B1 * | 3/2020 | Christensen | G08G 1/164 |
| 11,360,181 | B2 * | 6/2022 | Dingli | G01S 3/8083 |
| 11,433,917 | B2 * | 9/2022 | Adireddy | G08G 1/163 |
| 11,524,700 | B2 * | 12/2022 | Oguro | B60W 30/165 |
| 11,745,733 | B2 * | 9/2023 | Tsuji | B60W 60/0017 701/23 |
| 11,897,458 | B2 * | 2/2024 | Kamiya | B60T 7/22 |
| 11,932,252 | B2 * | 3/2024 | Hashimoto | B60W 50/12 |
| 2015/0160654 | A1 * | 6/2015 | Nakamura | B25J 5/007 701/23 |
| 2017/0249839 | A1 * | 8/2017 | Becker | G08G 1/096725 |
| 2018/0211528 | A1 * | 7/2018 | Seifert | H04R 1/406 |
| 2019/0027032 | A1 * | 1/2019 | Arunachalam | G08G 1/0965 |
| 2019/0047578 | A1 * | 2/2019 | Swan | G06V 20/597 |
| 2019/0315345 | A1 * | 10/2019 | Newman | B60W 50/14 |
| 2019/0389455 | A1 | 12/2019 | Reed | |
| 2020/0001876 | A1 | 1/2020 | Puetz et al. | |
| 2020/0079386 | A1 | 3/2020 | Kim | |
| 2020/0098253 | A1 * | 3/2020 | Zeplin | G08G 1/087 |
| 2020/0231088 | A1 | 7/2020 | Bennemann et al. | |
| 2020/0238975 | A1 * | 7/2020 | Mizuno | B60W 50/14 |
| 2021/0031807 | A1 | 2/2021 | Yamamoto et al. | |
| 2021/0039678 | A1 | 2/2021 | Shojima | |
| 2021/0125494 | A1 * | 4/2021 | Cho | G01S 3/8032 |
| 2021/0347365 | A1 * | 11/2021 | Yamaguchi | G08G 1/16 |
| 2022/0212670 | A1 | 7/2022 | Aoki et al. | |
| 2022/0390085 | A1 * | 12/2022 | Beev | H04N 23/56 |

FOREIGN PATENT DOCUMENTS

| | | | |
|---|---|---|---|
| DE | 10 2011 102 024 | A1 | 4/2012 |
| DE | 10 2012 200 950 | B3 | 5/2013 |
| DE | 10 2013 220 307 | A1 | 4/2015 |
| DE | 10 2016 122 200 | A1 | 5/2018 |
| DE | 10 2017 216 800 | A1 | 3/2019 |
| DE | 10 2018 210 779 | A1 | 1/2020 |
| DE | 10 2019 118 183 | A1 | 1/2021 |
| DE | 10 2019 118 184 | A1 | 1/2021 |
| DE | 10 2019 134 148 | A1 | 6/2021 |
| EP | 2 620 929 | A1 | 7/2013 |
| GB | 2578916 | A | 6/2020 |
| WO | WO 2015/106914 | A1 | 7/2015 |
| WO | WO 2019/151266 | A1 | 8/2019 |
| WO | WO 2019/230020 | A1 | 12/2019 |
| WO | WO 2020/201796 | A1 | 10/2020 |

OTHER PUBLICATIONS

German-language Written Opinion (PCT/ISA/237) issued in PCT Application No. PCT/EP2022/058999 dated Aug. 11, 2022 with English translation (10 pages).

German-language Search Report issued in German Application No. 10 2021 108 808.9 dated Sep. 28, 2021 with partial English translation (11 pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

Chinese-language Office Action issued in Chinese Application No. 202280024544.4 dated Mar. 26, 2026, with English translation (20 pages).

* cited by examiner

METHOD AND SYSTEM FOR ASSISTING A DRIVER OF A MOTOR VEHICLE IN CLEARING A PATH FOR EMERGENCY VEHICLES

BACKGROUND AND SUMMARY OF THE INVENTION

The present invention relates to a method for assisting a driver of a motor vehicle in clearing an emergency path and to a driving assistance apparatus for a motor vehicle, which is in particular configured to carry out the method.

Automated motor vehicles, in particular belonging to SAE Level 2 or above, can have driving assistance systems that at least for a time undertake in an automated manner the lateral and/or longitudinal guidance of the motor vehicle.

For automated lateral guidance, what is known as a steering assistant may be provided, which ensures that the motor vehicle moves along the middle of a driving lane. This leads to a significant reduction in stress for the driver, especially during monotonous journeys on a straight and slightly winding road. The steering assistant in this case uses both recognized road markings and also—possibly depending on the vehicle speed—the position of the vehicle driving in front in the driving lane for guidance.

In order to ensure that an accident site is quickly reachable by emergency personnel if a traffic accident occurs, many countries prescribe the clearing of an emergency path. Provision is made, in particular for the clearing of an emergency path on a road having two or more lanes, for road users, in particular motor vehicles, in a left-hand driving lane to align themselves on the left-hand side of the driving lane and for road users in other driving lanes to align themselves on the right-hand side of the driving lane. To increase the driving comfort for the driver of the motor vehicle during the congestion situation, provision may be made for the driver to be assisted in clearing the emergency path.

Such a steering assistant can therefore have an emergency path function which ensures that the motor vehicle lines up during congestion situations: in congested traffic on highways, the motor vehicle, for example at speeds of below 60 km/h, aligns itself with respect to surrounding vehicles and/or recognized road markings in the manner of a swarm and can in this way assist the driver by way of steering interventions for the lateral shift of the motor vehicle when clearing an emergency path. Additionally or alternatively, the motor vehicle having the emergency path function can also clear an emergency path independently of other vehicles. In this way, emergency vehicles can pass as quickly as possible.

For example, DE 10 2016 122 200 A1 discloses a method for assisting a driver of a motor vehicle in clearing an emergency path, having the steps of: detecting a congestion situation for the motor vehicle, ascertaining the need for clearing the emergency path on the basis of the congestion situation, and outputting information and/or partially automated or fully automated controlling of the motor vehicle in dependence on the ascertained need for clearing the emergency path.

The disadvantage of the method disclosed in DE 10 2016 122 200 A1, however, is that the emergency path is cleared only on the basis of the recognized congestion situation, but a state of the driver is not included in the decision relating to the clearing of the emergency path.

Against the background of this prior art, it is the object of the present invention to specify an apparatus and a method which are both suitable for overcoming at least the aforementioned disadvantages of the prior art.

The object is achieved by the features of the claimed invention.

Accordingly, the object is achieved by a method for assisting a driver of a motor vehicle in clearing an emergency path. The method comprises detecting a congestion situation for the motor vehicle, ascertaining the need for clearing the emergency path on the basis of the congestion situation, detecting a viewing direction of the driver, and partially automated or fully automated controlling of the vehicle in dependence on the ascertained need for clearing the emergency path and on the detected viewing direction of the driver.

The SAE standard J3016 describes the taxonomy and definition for terms related to driving automation systems for on-road motor vehicles. It was issued by the SAE (Society of Automotive Engineers) International and has been in effect since January 2014. The taxonomy relates to six levels and describes their minimum requirements. The motor vehicle in the present case may be an automated motor vehicle of SAE Level 2 or above.

The partially automated or fully automated controlling can comprise partially automated or fully automated controlling of the lateral and/or longitudinal guidance of the motor vehicle for clearing the emergency path.

It is conceivable that the congestion situation is ascertained, among other things, on the basis of a speed of vehicles driving in front. It is conceivable that the necessity for clearing an emergency path occurs whenever a congestion situation is recognized or detected. However, it is also conceivable that the need for clearing an emergency path is linked to further, e.g. country-specific, legal regulations.

The method can comprise evaluating the detected viewing direction of the driver, in which it is determined whether the driver is looking in the direction of the detected congestion situation, and the partially automated or fully automated controlling of the motor vehicle can take place in dependence on the ascertained need for clearing the emergency path and on the evaluation of the detected viewing direction of the driver.

The partially automated or fully automated controlling of the motor vehicle can comprise partially automated or fully automated crossing of a road boundary in order to clear the emergency path. It is conceivable that the partially automated or fully automated crossing of the road boundary is carried out only if it is determined in the evaluation of the detected viewing direction that the driver is looking in the direction of the detected congestion situation.

The evaluation of the detected viewing direction can take place before and optionally even during the partially automated or fully automated controlling of the motor vehicle.

The method can comprise detecting at least one obstacle in a region to the side of the motor vehicle, and the partially automated or fully automated controlling of the motor vehicle can be effected in dependence on the detected obstacle.

The above description can be worded differently, as described below.

In the method, it is detected whether the driver is looking in the direction of the vehicle in front and consequently whether the driver is monitoring traffic, that is to say is sufficiently attentive. For this purpose, the detected viewing direction of the driver is evaluated. If it is determined that the driver is sufficiently attentive, a road boundary may be crossed, wherein even during the crossing, the viewing direction of the driver is detected and evaluated and it is determined whether the viewing direction is pointed in the congestion direction or in the direction of the motor vehicles driving in front.

It is conceivable that an evaluation of the driving trajectory of one or more vehicles driving in front and an inference of a trajectory shift to the outside (in the left lane to the left) is effected. If one or more vehicles driving in front have already crossed the driving lane to the outside, it can be inferred herefrom that this region can be crossed.

Additional safety can be obtained by monitoring a lateral space of the motor vehicle using sensors, for example a radar and/or an ultrasonic sensor.

Furthermore, a driving assistance apparatus for a motor vehicle is provided. The driving assistance apparatus can be configured to carry out the above-described method.

The driving assistance apparatus comprises a first sensor apparatus, in particular comprising a camera directed at a region in front of the motor vehicle, for detecting a congestion situation for the motor vehicle, a computational apparatus, connected to the first sensor apparatus, for ascertaining the need for clearing the emergency path on the basis of the congestion situation detected by the first sensor apparatus, and a second sensor apparatus, connected to the computational apparatus, in particular comprising a camera directed into an interior space of the motor vehicle for detecting a viewing direction of the driver.

The computational apparatus is configured to carry out partially automated or fully automated controlling of the motor vehicle in dependence on the ascertained need for clearing the emergency path and on the viewing direction of the driver detected by the second sensor apparatus.

The computational apparatus can be configured to carry out an evaluation of the detected viewing direction of the driver in which it is determined whether the driver is looking in the direction of the detected congestion situation and to carry out the partially automated or fully automated controlling of the motor vehicle in dependence on the ascertained need for clearing the emergency path and on the evaluation of the detected viewing direction of the driver.

The partially automated or fully automated controlling of the motor vehicle can comprise partially automated or fully automated crossing of a road boundary. It is conceivable that the partially automated or fully automated crossing of the road boundary is carried out only if it is determined in the evaluation of the detected viewing direction that the driver is looking in the direction of the detected congestion situation.

The computational apparatus can be configured to carry out the evaluation before and optionally even during the partially automated or fully automated controlling of the motor vehicle.

The driving assistance apparatus can comprise a third sensor apparatus, in particular comprising at least one radar and/or at least one ultrasonic sensor, which is/are directed at a region to the side of the motor vehicle, for detecting at least one obstacle in the region to the side of the motor vehicle. The computational apparatus can be configured to carry out the partially automated or fully automated controlling of the motor vehicle in dependence on the detected obstacle.

The driving assistance apparatus can be configured to detect a trajectory of at least one vehicle driving in front and to carry out the partially automated or fully automated controlling of the motor vehicle in dependence on the detected trajectory. For this purpose, the driving assistance apparatus can have an optional additional fourth sensor apparatus. Additionally or alternatively, the first sensor apparatus can be configured to detect the trajectory. The detected trajectory can also be used to determine the need for clearing the emergency path.

A motor vehicle having the above-described driving assistance apparatus can also be provided.

The description above relating to the method analogously also applies to the driving assistance apparatus and the motor vehicle, and vice versa.

The following text describes an embodiment with reference to FIGS. 1 and 2.

DETAILED DESCRIPTION OF THE DRAWINGS

Figure 1:
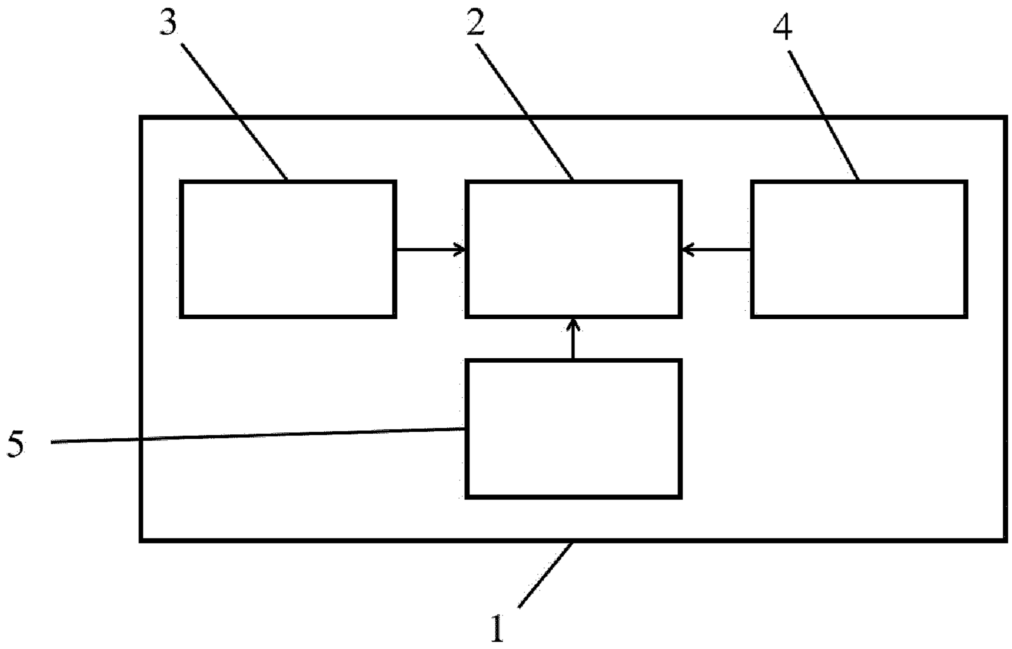
FIG. 1 schematically illustrates a driving assistance apparatus for a motor vehicle.
Figure 2:
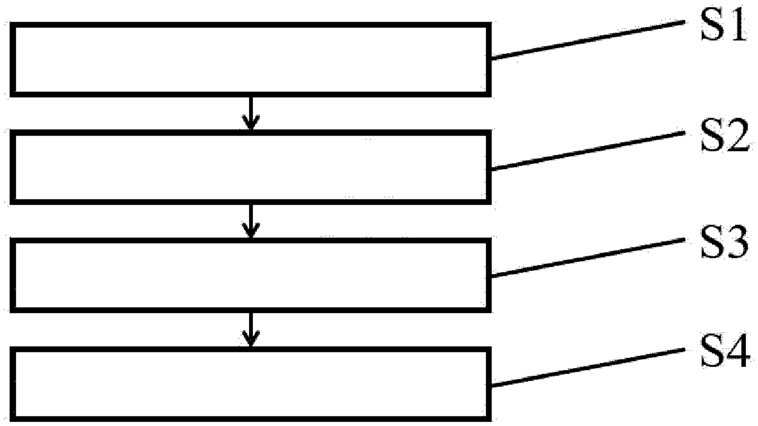
FIG. 2 schematically illustrates a flowchart of a method for assisting a driver of the motor vehicle in clearing an emergency path.

The driving assistance apparatus 1 illustrated in FIG. 1 is configured to carry out the method for assisting a driver of a motor vehicle in clearing an emergency path, the flowchart for which is illustrated in FIG. 2.

To this end, the driving assistance apparatus 1 comprises a computational apparatus 2 and a plurality of, in the present case three, sensor apparatuses 3, 4, 5.

In a first step S1 of the method, a congestion situation for the motor vehicle is detected by way of the first sensor apparatus 3. The first sensor apparatus 3 to this end has in the present case one camera, which records images of a region lying in front of the motor vehicle in a main driving direction of the motor vehicle.

In a second step S2 of the method, a need for clearing the emergency path is ascertained by way of the computational apparatus 2, which is connected to the first sensor apparatus 3, on the basis of the congestion situation detected by the first sensor apparatus 3, in the present case on the basis of image data output by the first sensor apparatus 3.

In a third step S3 of the method, a viewing direction of the driver is detected by way of a second sensor apparatus 4 connected to the computational apparatus 2, in the present case a camera which records images of a driver of the motor vehicle who is situated in an interior space of the motor vehicle. In the present case, this means that the viewing direction is ascertained on the basis of image data output by the second sensor apparatus 4.

More specifically, the computational apparatus is configured to carry out, in the third step S3, an evaluation of the detected viewing direction of the driver in which it is determined whether the driver is looking in the direction of the detected congestion situation.

In the third step S3, it is additionally determined by way of a third sensor apparatus 5 whether at least one obstacle, for example a further motor vehicle, is present in a region to the side of the motor vehicle.

In addition, a trajectory of at least one vehicle driving in front is detected in the third step S3 by way of the first sensor apparatus 3.

The computational apparatus is configured to carry out, in a fourth step S4 of the method, partially automated or fully automated controlling of the motor vehicle in dependence on the ascertained need for clearing the emergency path and on the viewing direction of the driver detected by the second sensor apparatus.

The partially automated or fully automated controlling of the motor vehicle comprises partially automated or fully automated crossing of a road boundary.

More specifically, in the fourth step S4, the partially automated or fully automated controlling of the motor vehicle is carried out in dependence on the ascertained need for clearing the emergency path and on the evaluation of the detected viewing direction of the driver, wherein the partially automated or fully automated crossing of the road boundary is carried out only if it is determined in the evaluation that the driver is looking in the direction of the detected congestion situation.

The computational apparatus 2 is here configured to carry out the evaluation of the viewing direction before and optionally also during the partially automated or fully automated controlling of the motor vehicle.

Furthermore, the computational apparatus 2 is configured to carry out the partially automated or fully automated controlling of the motor vehicle in the fourth step S4 in dependence on the detected obstacle, in particular in a manner such that a collision of the motor vehicle with the obstacle is avoided.

Furthermore, the computational apparatus 2 is configured to carry out the partially automated or fully automated controlling of the motor vehicle in the fourth step S4 in dependence on the detected trajectory of the vehicles driving in front (swarm intelligence).

LIST OF REFERENCE SIGNS

1 Driving assistance apparatus
2 Computational apparatus or control apparatus
3 First sensor apparatus
4 Second sensor apparatus
5 Third sensor apparatus
S1-S4 Steps of the method

The invention claimed is:

1. A method for assisting a driver of a motor vehicle in clearing an emergency path on a road for an emergency vehicle, the method comprising:
- detecting a congestion situation on the road in front of the motor vehicle,
- ascertaining a need for clearing the emergency path on the road for the emergency vehicle based on the detected congestion situation,
- detecting a viewing direction of the driver,
- detecting at least one obstacle in a region to a left-hand side or a right-hand side of the motor vehicle, and
- performing partially automated or fully automated controlling of the motor vehicle in dependence on the ascertained need for clearing the emergency path, on the detected viewing direction of the driver, and on the detected at least one obstacle, wherein:
- the partially automated or fully automated controlling of the motor vehicle comprises partially automated or fully automated controlling of lateral and/or longitudinal guidance of the motor vehicle to clear the emergency path on the road for the emergency vehicle,
- the partially automated or fully automated controlling of the motor vehicle is performed upon determining that the driver is looking in a direction of the detected congestion situation, and
- the partially automated or fully automated controlling of the motor vehicle comprises partially automated or fully automated crossing of a road boundary.

2. The method according to claim 1, further comprising detecting a trajectory of at least one vehicle driving in front, wherein the partially automated or fully automated controlling of the motor vehicle is effected in dependence on the detected trajectory.

3. A driving assistance apparatus for a motor vehicle configured to assist a driver of the motor vehicle in clearing an emergency path on a road for an emergency vehicle, the driving assistance apparatus comprising:
- a first sensor apparatus for detecting a congestion situation on the road in front of the motor vehicle,
- a computational apparatus, connected to the first sensor apparatus, for ascertaining a need for clearing an emergency path on the road for the emergency vehicle based on the congestion situation detected by the first sensor apparatus,
- a second sensor apparatus, connected to the computational apparatus, for detecting a viewing direction of the driver, and
- a third sensor apparatus, connected to the computational apparatus, for detecting at least one obstacle in a region to a left-hand side or a right-hand side of the motor vehicle, wherein:
- the computational apparatus is configured to perform partially automated or fully automated controlling of the motor vehicle in dependence on the ascertained need for clearing the emergency path, on the detected viewing direction of the driver, and on the detected at least one obstacle,
- the partially automated or fully automated controlling of the motor vehicle comprises partially automated or fully automated controlling of lateral and/or longitudinal guidance of the motor vehicle to clear the emergency path on the road for the emergency vehicle,
- the computational apparatus is further configured to perform the partially automated or fully automated controlling of the motor vehicle upon determining that the driver is looking in a direction of the detected congestion situation, and
- the partially automated or fully automated controlling of the motor vehicle comprises partially automated or fully automated crossing of a road boundary.

4. The driving assistance apparatus according to claim 3, wherein the driving assistance apparatus is further configured to detect a trajectory of at least one vehicle driving in front and to carry out the partially automated or fully automated controlling of the motor vehicle in dependence on the detected trajectory.

* * * * *